H. GALE.
Plow-Wheel Attachment.
No. 199,636. Patented Jan. 29, 1878.
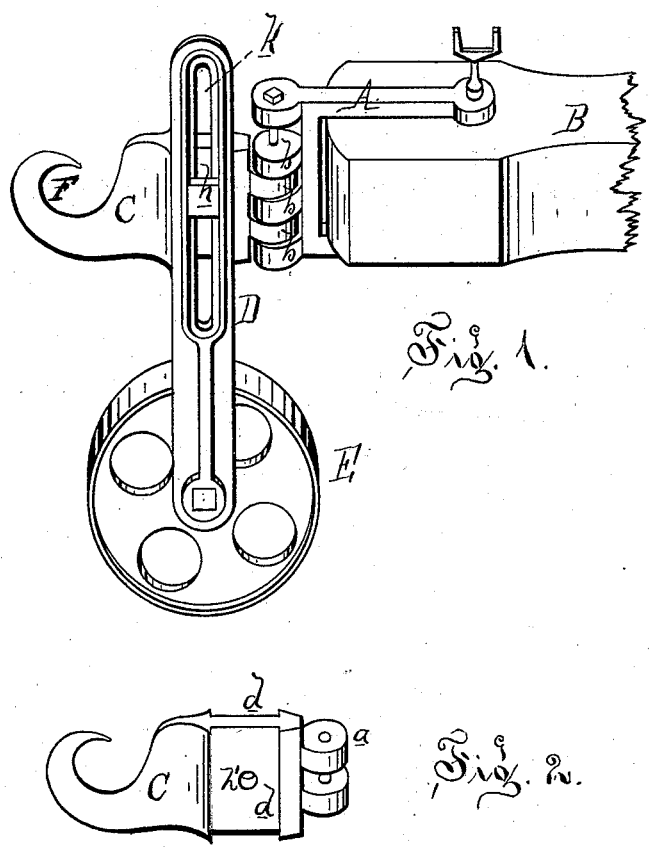

UNITED STATES PATENT OFFICE.

HORATIO GALE, OF ALBION, MICHIGAN.

IMPROVEMENT IN PLOW-WHEEL ATTACHMENTS.

Specification forming part of Letters Patent No. 199,636, dated January 29, 1878; application filed July 17, 1877.

*To all whom it may concern:*

Be it known that I, HORATIO GALE, of Albion, in the county of Calhoun and State of Michigan, have invented an Improvement in Plow-Wheel Attachments, of which the following is a specification:

The nature of my invention relates to a certain new and novel attachment of wheels to plows; and it consists in the device as more fully hereinafter described.

In the drawing, A represents a clevis attached to the beam B of the plow, in the usual manner. C is a hook provided with two ears, $a$, through which are suitable bolt-holes, coincident with similar holes through the similar ears $b$ of the clevis, and by means of which and a proper bolt the hook is adjustably secured to the clevis. Upon one or both sides of the face of the hook there are recesses $d$, within which the standard D is adjustably secured by means of the bolt $h$, passing through the vertical slot $k$ in the standard, and through the bolt-hole $h'$ in the center of the recessed part of the face of the hook.

The wheel E is secured to the lower end of the standard, in the usual manner.

F is the hook to which the draft force is applied to operate the plow.

Figure 1 is a perspective of my attachment, shown as secured to the fore end of a plow-beam. Fig. 2 is a perspective view of the hook disconnected from other portions of the device.

By the use of this attachment the objections to the employment of the wheel, as ordinarily used and attached in heavy soils, are obviated. The principal of these objections is, that the wheel attached to a standard, which, in turn, is attached to the beam, becomes a fulcrum, by means of which the plow is thrown out of heavy or hard ground, unless the plowman exerts his greatest strength to prevent it.

Another objection which I desire to overcome is, that the wheel, as ordinarily attached to the beam, is not in the line of draft unless the draft force is directly in line with the beam.

The vertical adjustability of the hook, by means of the ears of the hook and clevis and bolt, controls the pitch of the plow; and the hook carrying the standard of the wheel always keeps the wheel in the draft-line, and prevents the wheel and standard from acting as a fulcrum to throw the plow out of hard ground.

What I desire to secure by Letters Patent as my invention is—

The combination, with the clevis A, having ears $b$ and a vertical bolt, of the hook C, provided with ears $a$, for attachment to clevis, and having recessed side $d$ and hole $h'$, the slotted wheel-standard D, and square-headed bolt $h$, all constructed and arranged substantially as described and shown.

HORATIO GALE.

Witnesses:
H. S. SPRAGUE,
H. L. AULLS.